United States Patent [19]

Fraga

[11] Patent Number: 5,042,863
[45] Date of Patent: Aug. 27, 1991

[54] PORTABLE STORAGE ASSEMBLY

[76] Inventor: Otto F. Fraga, 12300 SW. 46th St., Miami, Fla. 33175

[21] Appl. No.: 564,778

[22] Filed: Aug. 9, 1990

[51] Int. Cl.$^5$ .............................................. B60R 7/00
[52] U.S. Cl. ................................... 296/24.1; 108/67; 211/149
[58] Field of Search ................... 296/24.1; 108/67, 69; 211/104, 149, 150

[56] References Cited

U.S. PATENT DOCUMENTS

| | | | |
|---|---|---|---|
| 2,478,448 | 8/1949 | Ashford | 296/24.1 |
| 3,000,666 | 9/1961 | Fernandes | 296/24.1 |
| 3,588,166 | 6/1971 | Day | 296/24.1 |
| 3,589,768 | 6/1971 | Wilson | 296/24.1 |
| 3,897,971 | 8/1975 | Evans | 211/149 |
| 3,929,371 | 12/1975 | Gibson | 296/24.1 |
| 4,637,647 | 1/1987 | Bunting et al. | 296/24.1 |

FOREIGN PATENT DOCUMENTS 449589  6/1936  United Kingdom ............... 296/24.1

*Primary Examiner*—Robert R. Song
*Attorney, Agent, or Firm*—Malloy, Downey & Malloy

[57] ABSTRACT

A portable storage assembly for use in the cargo space of a truck comprising foldable sets of shelf panels, each set including at least two shelf panels hingedly connected to one another and to an interior side wall of the truck so as to be movable between a folded, stored position and an extended, operable position. The shelf sets are hingedly mounted along opposite interior walls at various levels spaced from the truck floor so as to form storage shelves extending transversely across the width of the truck at various height levels in the cargo space when in the extended, operable position. A pair of transverse support bars extending between the opposite interior walls, and secured at opposite ends by U-shaped braces, provide support to an under side of the shelf panels so that a load can be placed on an upper support surface of the panels. A wedge fitted in the aperture of an eye bolt extending through holes in the panels serves to retain a shelf set in the folded, upright stored position against the interior wall surface of the cargo space when not in use.

13 Claims, 4 Drawing Sheets

PORTABLE STORAGE ASSEMBLY

BACKGROUND OF THE INVENTION

1. Field of the Invention

A portable storage assembly comprising foldable sets of shelves movable between a folded, stored position and an extended operable position to form shelves extending transversely between two walls at spaced levels from the floor.

2. Description of the Prior Art

The use of trucks and vans in commercial industry for transporting cargo is a well known means of shipment. Unfortunately, most trucks and vans include a single large cargo space having a floor, side walls and a ceiling wherein the overall height of the space may be as much as eight to ten feet. Often, the cargo transported in these high cargo spaces is delicate and non-stackable. One example of this is in the nursery industry wherein plants of two to three feet in height are normally placed side by side on the floor of the cargo space leaving as much as six feet of unused space above the plants. Because of the delicate nature of most plants, it is impossible to stack one upon the other without the use of some type of support therebetween and therefore, the space above the plants is rendered unusable.

The loss of storage capacity in most trucks and vans makes it extremely inefficient to ship large quantities of unstackable cargo such as plants and other delicate items, requiring the shipper to make several additional trips between the place of shipment and the destination of the cargo.

In an attempt to overcome the problem of lost storage space, many shippers have installed shelf assemblies in their trucks allowing them to stack delicate cargo at various levels throughout the height of the cargo space. While this has proven to be somewhat effective, there still are times when the full height of the cargo space is required for large pieces of cargo, such as tall trees, large boxes and other pieces of cargo which would not normally fit between shelves extending across the cargo space.

Some trucks in the prior art include removable shelves which can be placed in the cargo space when carrying smaller pieces of unstackable cargo and are removable to accommodate larger pieces of cargo. This has proven to be effective in accommodating the shipment of both large and smaller, more delicate pieces of unstackable cargo. However, these removable shelf structures are quite cumbersome and require a great deal of labor to remove and install them. Additionally, once disassembled, the shelf structures have to be removed from the cargo space in order to maximize the storage capacity.

Accordingly, there exists a need in the shipping industry for a portable storage assembly comprising foldable or collapsible shelf panels adapted to move between a folded, stored position along the interior side walls of the truck and an extended, operable position forming shelves extending transversely across the cargo space at spaced levels throughout the height thereof.

SUMMARY OF THE INVENTION

The present invention relates to a portable storage assembly for use in trucks and vans to increase the overall storage capacity within the cargo space.

The storage assembly includes foldable sets of shelves, with each set having a pair of shelf panels hingedly connected along adjacent edges with one of the panels further hingedly attached to an interior wall surface of the cargo space. The shelf panels in each foldable shelf set are movable between a folded, stored position against the wall surface and an extended, operable position extending outwardly in perpendicular relation to the wall.

Support bars are removably inserted within the cargo space so as to extend transversely across the space being braced at opposite ends by U-shaped braces affixed to opposite interior side walls of the cargo space. In this manner, two foldable shelf sets, affixed opposite one another on the opposite side walls can be extended into the operable position so as to rest on two transverse support bars thereby forming a shelf extending across the width of the cargo space.

The shelf sets can be positioned side by side along both opposite interior side walls of the cargo space wherein a continuous shelf can be formed extending along the entire length of the cargo space. Additionally, some of the shelf sets can remain in the stored position while other shelf sets can be extended to the operable position to form shelves in various locations along the length of the cargo space as desired.

To further maximize the use of the entire vertical space, the foldable shelf sets, support bars and brackets can be mounted at various levels along the interior side walls so that several shelf levels can be formed at spaced intervals from the floor of the cargo space.

When in the folded, stored position, the shelf panels are retained in place by means of an eye bolt and wedge. In use, a plurality of eye screws or bolts are mounted through the side walls of the cargo space and are positioned to allow the head portion of the screw or bolt to pass through holes in the shelf panels when in the folded, stored position against the wall. The wedge is then inserted through the aperture of the head portion of the eye screw in blocking relation to the holes in the shelf panels so as to prevent unfolding of the shelf sets from their folded, stored position.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings, in which.

Like reference numerals refer to like parts throughout the several views of the drawings.

DETAILED DESCRIPTION OF THE PREFERRED EMBODIMENT

Figure 1:
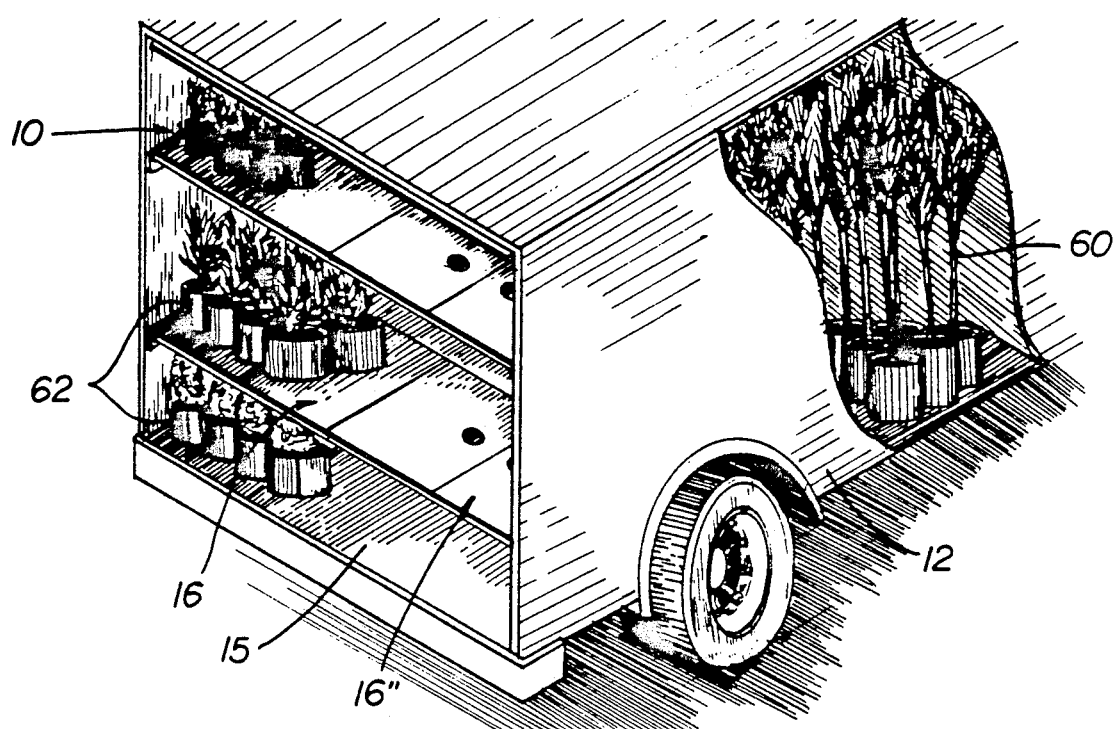
FIG. 1 is a perspective view in partial cutaway of the storage assembly of the present invention shown in use in the cargo space of a truck.
Figure 2:
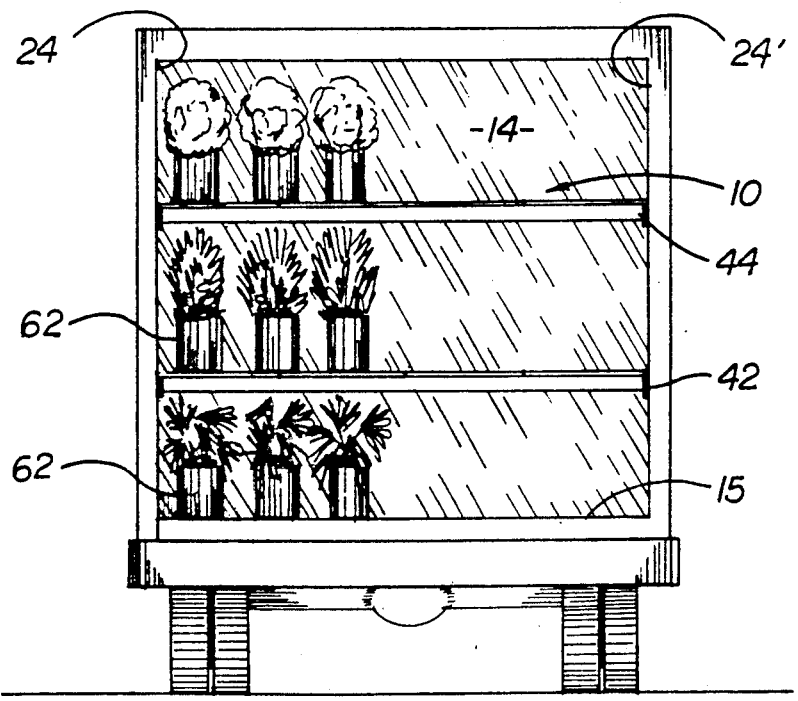
FIG. 2 is an end plan view of the cargo space of the truck in FIG. 1.
Figure 3:
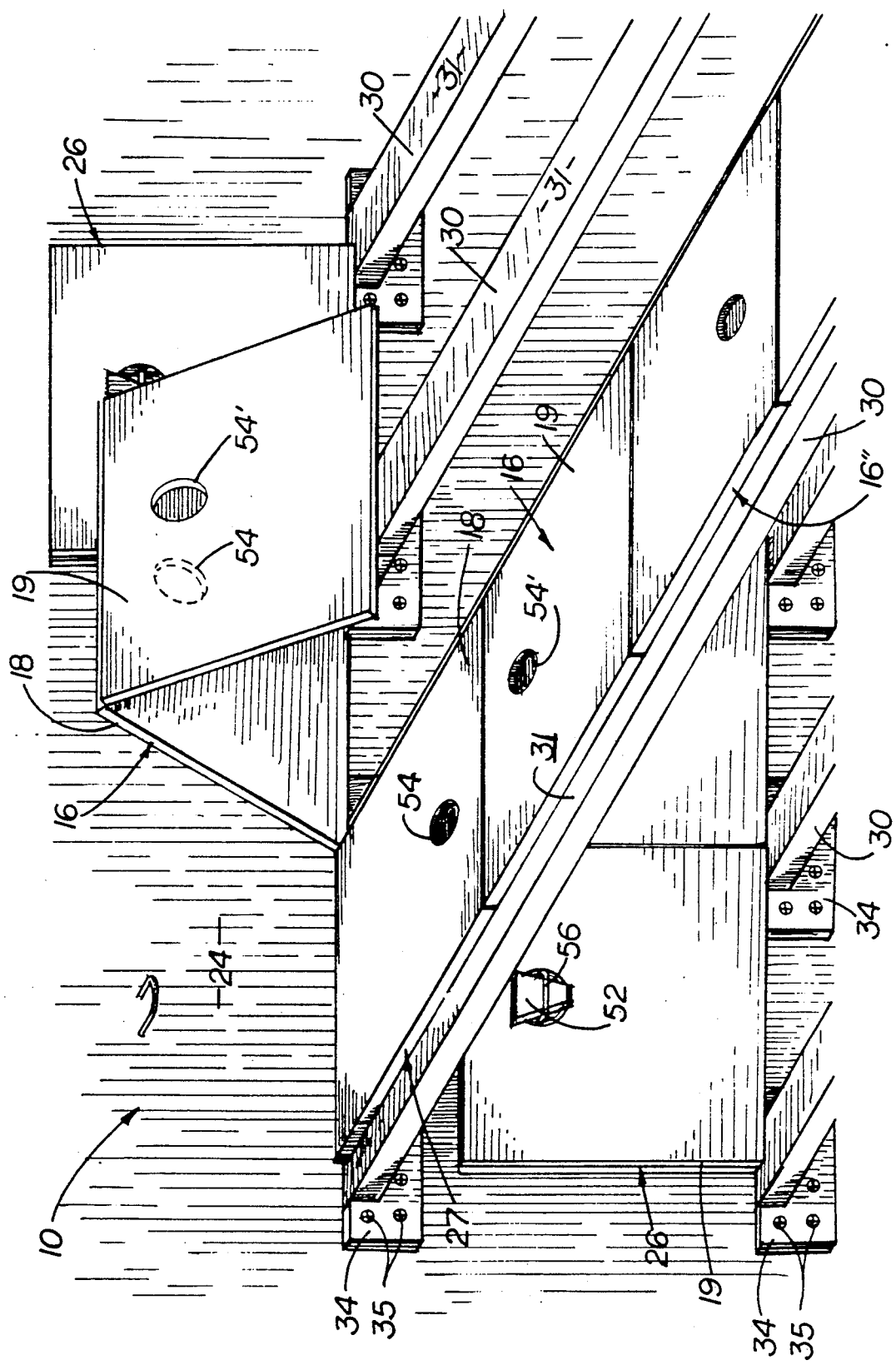
FIG. 3 is a perspective view illustrating the storage assembly of the present invention.

As shown in FIGS. 1-3, the present invention is directed to a portable storage assembly generally indicated as 10 for use in a truck, van or like vehicle. As described in more detail hereinafter, the storage assembly 10 comprises foldable shelf sets adapted to unfold to an extended operable position in supported relation on two parallel, transverse support bars extending across the cargo space 14 of the truck 12.

Figure 4:
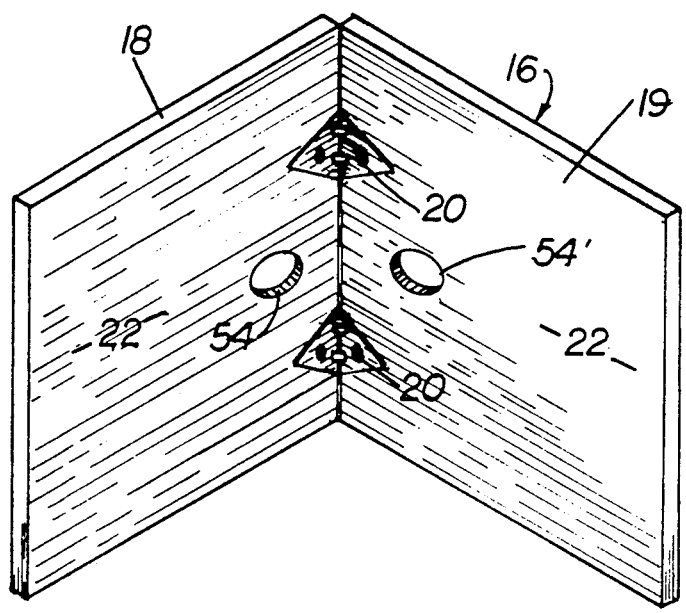
FIG. 4 is a perspective view of a shelf set of the present invention.

As illustrated in FIGS. 3 and 4, the shelf sets 16 include two shelf panels including an outboard panel 18 and an inboard panel 19. The shelf panels 18 and 19 are hingedly attached along correspondingly positioned adjacent edges by conventional hinges 20 mounted to a lower surface 22 and 22' of the panels. Additionally, the outboard panel 18 is hingedly attached along a side edge to an interior wall surface 24 of the cargo space 14 so that the shelf set 16 is movable between a folded stored position, indicated as 26 in FIG. 3, and extended, operable position, indicated as 27 in FIG. 3.

Figure 5:
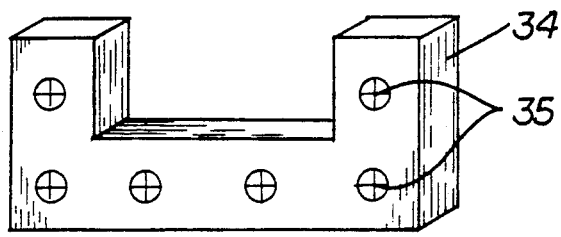
FIG. 5 is a perspective view of a U-shaped brace of the present invention.
Figure 6:
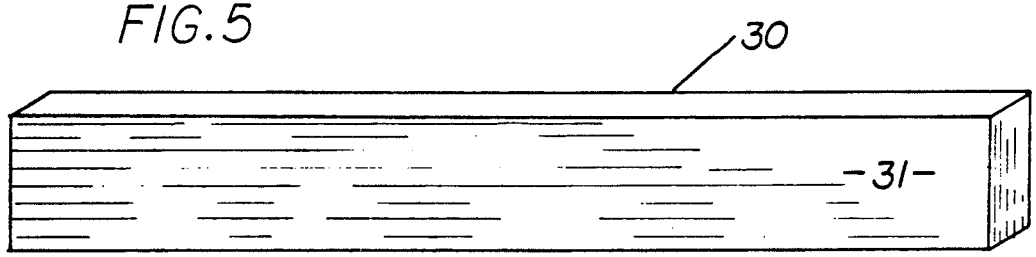
FIG. 6 is a perspective view of a transverse support bar of the present invention.
Figure 7:
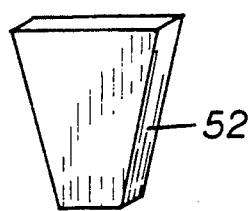
FIG. 7 is a perspective view of a wedge of the retaining means of the present invention.
Figure 8:
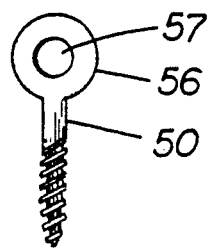
FIG. 8 is a perspective view of an eye screw of the retaining means of the present invention.

As best shown in FIGS. 3 and 6, the portable storage assembly further includes transverse support bars 30 adapted to be removably positioned in parallel spaced relation extending transversely across the cargo space 14 between opposite interior side walls 24 and 24'. Each of the transverse support bars 30 is braced at opposite ends by a U-shaped brace fitting 34 as best illustrated in FIGS. 3 and 5. A plurality of the U-shaped braces 34 are permanently installed along the side walls 24 and 24' of the cargo space 14 being preferably secured thereto by conventional screws 35 extending through the U-shaped brace into the walls 24 and 24'.

Figure 9:
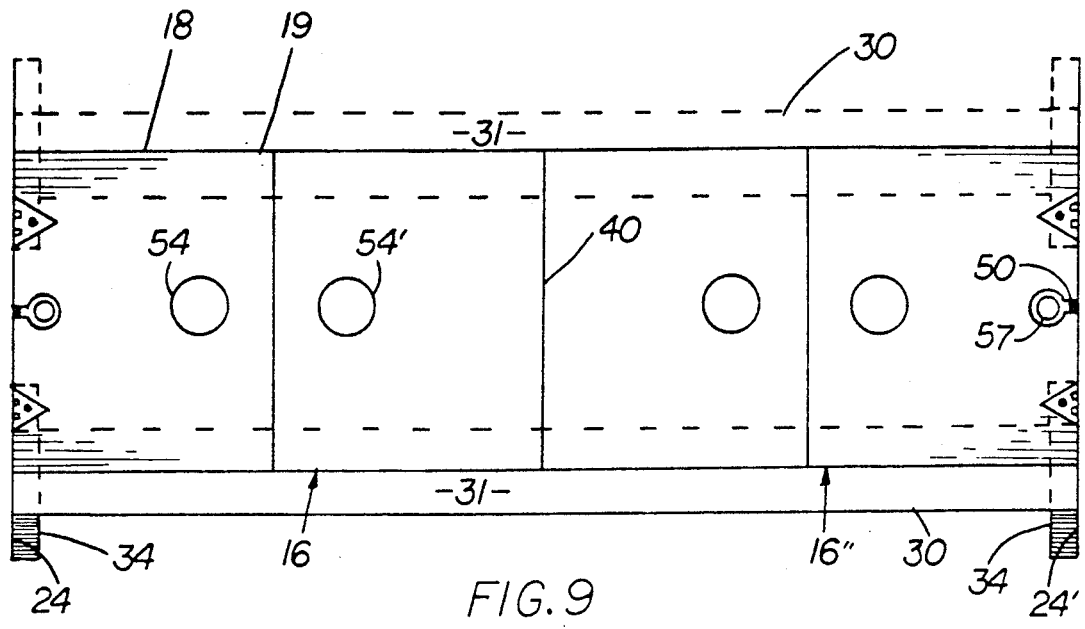
FIG. 9 is a plan view of shelf panels mounted on support bars.
Figure 10:
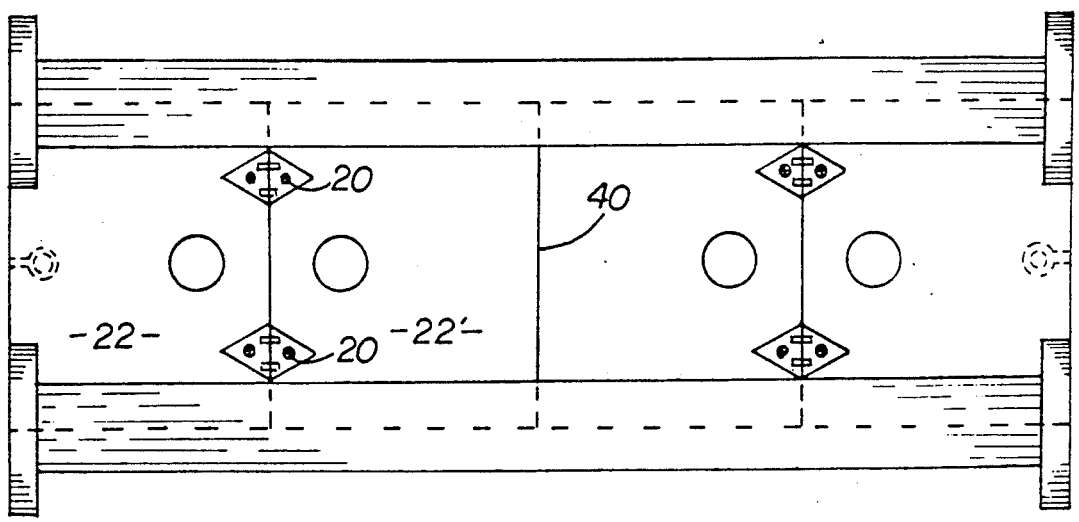
FIG. 10 is a bottom view of shelf panels mounted on support bars.

In use, the transverse support bars are installed in pairs extending in parallel relation between the opposite walls 24 and 24' so as to be disposed in supporting relation along a front and rear lower edge of the lower surfaces 22 and 22' of the shelf panels. Accordingly, in the collapsed, extended operable position, the panels 18 and 19 of the shelf set 16 rest along a portion of the length of two parallel support bars 30. The support bars 30 are preferably positioned so that the panels 18 and 19 rest on half of the upper surface 31 of the support bars 30 leaving the other half of the upper surface 31 available to support an adjacently positioned shelf set 16' as best illustrated in FIGS. 3, 9 and 10.

In the preferred embodiment, a plurality of shelf sets are hingedly mounted side by side on both opposite interior side walls 24 and 24' of the cargo space 14 so as to be extendable across half the width of the space 14. In this manner, two oppositely oriented shelf sets 16 and 16" can be lowered from the stored position so as to extend into the operable position resting on the support bars 30 and meeting at three distal edges 40 at approximately the midway portion across the width of the cargo space 14. In this manner, a continuous shelf can be formed across the entire width of the cargo space 14.

In the preferred embodiment, a plurality of shelf sets 16 and support bars 30 are positionable at various levels such as 42 and 44 throughout the height of the cargo space 14 so as to maximize the vertical storage capacity within the cargo space 14.

In order to retain the shelf panels 18 and 19 of the shelf sets 16 in the folded, upright stored position against the side walls 24 and 24', a retaining device is used which includes an eye screw 50 and a wedge 52. In a preferred embodiment, a plurality of the eye screws 50 are permanently installed in the side wall 24 and 24' being specifically positioned so as to extend through holes 54 and 54' formed in the shelf panels 18 and 19 when in the folded, upright stored position. The head portion 56 of the eye screw 50 is adapted to extend through the holes 54 and 54' when in the folded, upright stored position so that the wedge 52 can be inserted into an aperture 57 of the head portion 56 in blocking relation to the holes 54 and 54' so that the head portion cannot thereafter pass back through the holes thereby retaining the panels 18 and 19 of the shelf set 16 in their folded, upright stored position against the walls 24 and 24'.

As shown in FIGS. 1 and 2 in use, the storage assembly is extremely versatile and can be easily moved between the stored position and the operable position by simply inserting the longitudinal support bars 30 in fixed position in the braces on opposite side walls 24 and 24' and thereafter lowering individual shelf sets as desired. In this manner, if it is desired to carry relatively tall items such as trees 60, the shelf sets such as 16 and 16' can be kept in their folded, upright stored position with the support bars 30 removed allowing for full interrupted use of the vertical storage space. Additionally, if it is desired to carry smaller items which are delicate and not generally stackable, such as small plants 62, the shelf sets such as 16, 16' and 16" can be lowered into their operable position resting on the support bars 30, thereby forming a shelf level such as 42 and 44' as shown in FIG. 2. In this manner, the plants 62 can be stored on the floor 15 of the cargo space 14 as well as the shelf levels 42 and 44 thereby allowing for full vertical use of the storage space 14.

Now that the invention has been described,

What is claimed is:

1. A portable storage assembly for use in a cargo space of a truck, said assembly comprising:

foldable shelf means including at least one shelf set comprising a pair of shelf panels each having an upper support surface and a lower surface, said pair of shelf panels including an inboard panel and an outboard panel hingedly attached to one another along correspondingly positioned, adjacent side edges, with one of said shelf panels being hingedly attached along an outboard side edge to an interior wall surface of the cargo space so as to allow movement of said shelf panels between a folded, upright stored position and an extended, operable position, shelf support means releasably mounted to opposite interior wall surfaces in the cargo space and adapted to extend therebetween and below each of said shelf panels in supporting engagement with said lower surface thereof so as to support a load on said upper surface with said panels in said extended, operable position, brace means mounted to the interior wall surface of the cargo space structured and disposed to brace said shelf support means in fixed supporting position below said shelf panels, and retaining means for retaining each of said pair of shelf panels in said folded, stored position against the interior wall surface of the cargo space.

2. An assembly as in claim 1 wherein said foldable shelf means includes a plurality of shelf sets hingedly mounted along said opposite interior wall surfaces in the cargo space.

3. An assembly as in claim 2 wherein each of said plurality of shelf sets includes said inboard panel and said outboard panel hingedly attached along said adjacent side edges.

4. An assembly as in claim 3 wherein said outboard panel of each of said shelf sets is hingedly attached to one of the interior wall surfaces along said outboard side edge so as to allow movement of said shelf sets between said folded, stored upright position and said extended, operable position.

5. An assembly as in claim 4 wherein a plurality of said shelf sets are hingedly mounted along the length of the opposite interior wall surfaces of the cargo space so as to form a uniform, horizontal shelf across the entire width of the cargo space when in said extended, operable position.

6. An assembly as in claim 5 wherein oppositely mounted shelf sets are structured and configured so as to meet along free terminal edges of said inboard panels when said shelf sets are in said extended, operable position.

7. An assembly as in claim 6 wherein said support means comprises a pair of transverse support bars releasably mounted to the opposite interior wall surfaces at corresponding opposite end thereof and structured and disposed so as to extend between the opposite interior wall surfaces in supporting engagement with said lower surface of said shelf panels of said oppositely mounted shelf sets when in said extended, operable position.

8. An assembly as in claim 7 wherein said brace means includes a plurality of U-shaped brace fittings mounted to the opposite interior wall surfaces, each of said brace fittings including a cradle portion structured to receive a distal end of one of said transverse support bars in fixed, braced relation to the interior wall surface.

9. An assembly as in claim 8 wherein oppositely mounted pairs of said U-shaped fittings act to support opposite distal ends of said one of said transverse support bars so as to maintain said support bar in fixed, braced relation to the opposite interior wall surfaces, extending transversely across the cargo space in supporting relation to said oppositely mounted shelf sets when in said extended, operable position.

10. An assembly as in claim 9 wherein said retaining means includes an eye screw having a straight threaded portion adapted to be threadably manipulated through the interior wall surface so as to mount the eye screw thereto, said eye screw further including a head portion having a central aperture extending therethrough, said head portion structured and configured to pass through congruent holes formed in each of said shelf panels when in said folded, stored position.

11. An assembly as in claim 10 wherein said retaining means further includes a removable wedge adapted to be inserted within said aperture of said head portion of said eye bolt so as to prevent passage of said head portion back through said holes in said shelf panels, thereby retaining said shelf panels in said folded, stored position.

12. An assembly as in claim 11 wherein said wedge includes a papered configuration so as to provide a snug fit within said aperture of said head portion.

13. An assembly as in claim 12 wherein the support assembly can be installed within the cargo space at spaced levels along the height of the opposite interior walls so as to form a plurality of spaced, shelf levels throughout the height of the cargo space.

* * * * *